(12) United States Patent
Yang et al.

(10) Patent No.: US 10,693,965 B2
(45) Date of Patent: *Jun. 23, 2020

(54) STORING DATA IN DISTRIBUTED SYSTEMS

(71) Applicant: Alibaba Group Holding Limited, George Town (KY)

(72) Inventors: Zhenkun Yang, Hangzhou (CN); Yuzhong Zhao, Hangzhou (CN); Wenhui Shi, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/722,531

(22) Filed: Dec. 20, 2019

(65) Prior Publication Data
US 2020/0128076 A1    Apr. 23, 2020

Related U.S. Application Data

(63) Continuation of application No. 16/227,611, filed on Dec. 20, 2018, which is a continuation of application No. PCT/CN2017/087378, filed on Jun. 7, 2017.

(30) Foreign Application Priority Data

Jun. 20, 2016    (CN) .......................... 2016 1 0444320

(51) Int. Cl.
*H04L 29/08*    (2006.01)
*H04L 12/24*    (2006.01)
(Continued)

(52) U.S. Cl.
CPC ...... *H04L 67/1097* (2013.01); *G06F 11/1658* (2013.01); *G06F 11/2023* (2013.01);
(Continued)

(58) Field of Classification Search
CPC . H04L 67/1097; H04L 29/08; H04L 41/0668; H04L 67/1095; H04L 41/30;
(Continued)

(56) References Cited

U.S. PATENT DOCUMENTS 9,348,883 B2    5/2016    Gale et al.
2007/0005662 A1    1/2007    Bankston et al.
(Continued)

FOREIGN PATENT DOCUMENTS

CN    101189611    5/2008
CN    101741911    6/2010
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Caroline H Jahnige
(74) *Attorney, Agent, or Firm* — Fish & Richardson P.C.

(57) ABSTRACT

One example method includes receiving, by the one or more processors, a request to update data stored on a distributed data storage system that comprises a primary server and a plurality of secondary servers, the request comprising data updates; sending, by the one or more processors, an update log instruction to the primary server and the plurality of secondary servers so that each of the primary server and the plurality of secondary servers records a log associated with the request; determining, by the one or more processors, that the log has been recorded; and in response to determining that the log has been recorded, sending, by the one or more processors, a data storage instruction to the primary server (Continued)

and a secondary server of the plurality of secondary servers so that each of the primary server and the secondary server stores the data updates.

17 Claims, 10 Drawing Sheets

(51) Int. Cl.
  *G06F 11/20* (2006.01)
  *G06F 11/16* (2006.01)
  *G06F 16/182* (2019.01)
  *G06F 16/23* (2019.01)

(52) U.S. Cl.
  CPC ........ *G06F 16/182* (2019.01); *G06F 16/1844* (2019.01); *G06F 16/2379* (2019.01); *H04L 29/08* (2013.01); *H04L 41/0668* (2013.01); *G06F 2201/85* (2013.01)

(58) Field of Classification Search
  CPC .............. G06F 16/182; G06F 11/2023; G06F 11/1658; G06F 16/2379; G06F 16/1844; G06F 2201/85
  See application file for complete search history.

(56) References Cited

U.S. PATENT DOCUMENTS

| | | | |
|---|---|---|---|
| 2007/0180302 | A1 | 8/2007 | Allen et al. |
| 2008/0301199 | A1* | 12/2008 | Bockhold ........... G06F 11/2023 |
| 2011/0093440 | A1 | 4/2011 | Asakura et al. |
| 2012/0030172 | A1 | 2/2012 | Pareek |
| 2012/0303577 | A1* | 11/2012 | Calder ................ G06F 11/2074 707/613 |
| 2015/0370664 | A1* | 12/2015 | Furue .................. G06F 11/2028 714/4.11 |
| 2016/0077936 | A1* | 3/2016 | Tang ................... G06F 11/2028 714/4.11 |
| 2019/0149605 | A1 | 5/2019 | Yang et al. |

FOREIGN PATENT DOCUMENTS

| | | |
|---|---|---|
| CN | 103560906 | 2/2014 |
| CN | 103580891 | 2/2014 |
| CN | 104346373 | 2/2015 |
| CN | 104657382 | 5/2015 |
| CN | 105426439 | 3/2016 |
| CN | 105554142 | 5/2016 |
| EP | 2429134 | 3/2012 |
| KR | 20030068844 | 4/2010 |
| KR | 20100044482 | 4/2010 |
| RU | 2007147644 | 6/2009 |
| WO | WO 2007005106 | 1/2007 |
| WO | WO 2011109416 | 9/2011 |

OTHER PUBLICATIONS

European Extended Search Report in European Application No. 17814595.9, dated Feb. 19, 2019, 7 pages.
International Search Report by the International Searching Authority issued in International Application No. PCT/CN2017/087378 dated Jul. 28, 2017; 12 pages.
Nakamoto, "Bitcoin: A Peer-to-Peer Electronic Cash System," www.bitcoin.org, 2005, 9 pages.
PCT International Preliminary Report on Patentability in International Application No. PCT/CN2017/087378, dated Dec. 25, 2018, 8 pages (with English translation).

\* cited by examiner

STORING DATA IN DISTRIBUTED SYSTEMS

CROSS-REFERENCE TO RELATED APPLICATIONS

This application is a continuation of U.S. patent application Ser. No. 16/227,611, filed Dec. 20, 2018, which is a continuation of PCT Application No. PCT/CN2017/087378, filed on Jun. 7, 2017, which claims priority to Chinese Patent Application No. 201610444320.5, filed on Jun. 20, 2016, and each application is hereby incorporated by reference in its entirety.

TECHNICAL FIELD

The present disclosure relates to the field of computer technologies, and in particular, to a data processing method and device.

BACKGROUND

In a distributed data storage system, one server serves as a primary server and another server serves as a dependent server (hereinafter referred to as a secondary server). The primary server can provide an external data read/write service. The secondary server maintains data synchronization with the primary server, and when the primary server fails, the secondary server can provide the external data read/write service.

Usually, when receiving and storing data, the primary server can synchronously store the data in the secondary server, so as to ensure data consistency between the primary server and the secondary server. However, in practice, because there is an operation delay in data synchronization between the primary server and the secondary server, some data in the secondary server may be lost, which cannot ensure data consistency between the secondary server and the primary server.

To ensure data consistency between the primary server and the secondary server, in the existing technology, when the data stored in the primary server is synchronized to the secondary server, the data can be synchronized to a plurality of secondary servers. In other words, a plurality of data copies in the primary server can be stored. When data in one secondary server is lost, the lost data can be obtained from the other secondary servers. As such, when the primary server fails, the plurality of secondary servers can provide an external data read/write service.

However, because the plurality of data copies in the primary server need to be stored, a relatively large number of resources are needed for data storage.

SUMMARY

Implementations of the present application provide a data processing method and device that solves the above-identified problems.

An implementation of the present application provides a data processing method, where the method is applied to a distributed data storage system, the distributed data storage system includes a primary server and at least two secondary servers, and the method includes: receiving a data update request sent by a user, where the data update request includes data updates; sending a log update instruction separately to the primary server and the at least two secondary servers based on the data update request, so that the primary server and the at least two secondary servers perform a log update operation based on the log update instruction; and when it is determined that the log update operation is completed, sending a data storage instruction separately to the primary server and a first secondary server in the at least two secondary servers, so that the primary server and the first secondary server perform, based on the data storage instruction, a storage operation on the data updates.

An implementation of the present application further provides a data processing method, where the method is applied to a distributed data storage system, the distributed data storage system includes a primary server and at least two secondary servers, and the method includes: receiving, by the primary server, a data update request sent by a user, where the data update request includes data updates; initiating, by the primary server, a log update operation based on the data update request, and sending a log update instruction separately to the at least two secondary servers, so that the at least two secondary servers perform the log update operation based on the log update instruction; and when determining that the log update operation is completed, initiating, by the primary server, a data storage operation, and sending a data storage instruction to a first secondary server in the at least two secondary servers, so that the first secondary server performs, based on the data storage instruction, a storage operation on the data updates.

An implementation of the present application provides a data processing device, where the device is applied to a distributed data storage system, the distributed data storage system includes a primary server and at least two secondary servers, and the device includes a receiving unit and a sending unit. The receiving unit is configured to receive a data update request sent by a user, where the data update request includes data updates; the sending unit is configured to send a log update instruction separately to the primary server and the at least two secondary servers based on the data update request, so that the primary server and the at least two secondary servers perform a log update operation based on the log update instruction; and when determining that the log update operation is completed, the sending unit is configured to send a data storage instruction separately to the primary server and a first secondary server in the at least two secondary servers, so that the primary server and the first secondary server perform, based on the data storage instruction, a storage operation on the data updates.

An implementation of the present application further provides a data processing device, where the device is applied to a distributed data storage system, the distributed data storage system includes a primary server and at least two secondary servers, and the device includes a receiving unit and a sending unit. The receiving unit is configured to receive a data update request sent by a user, where the data update request includes data updates; the sending unit is configured to initiate a log update operation based on the data update request, and send a log update instruction to the at least two secondary servers, so that the at least two secondary servers perform the log update operation based on the log update instruction; and when determining that the log update operation is completed, the sending unit is configured to initiate a data storage operation, and send a data storage instruction to a first secondary server in the at least two secondary servers, so that the first secondary server performs, based on the data storage instruction, a storage operation on the data updates.

At least one of the previously described technical solutions adopted in the implementations of the present application can achieve the following beneficial effects. When receiving the data update request, the distributed data storage system can send a log update instruction separately to the primary server and the secondary servers, so that the primary server and the secondary servers perform log update operations, and send a data storage instruction to the primary server and one of the secondary servers when it is determined that the log update operation is completed. As such, when data in the secondary server is lost, the lost data can be restored by using the log prestored in the primary server and the secondary server, so as to ensure data consistency between the primary server and the secondary server. In addition, only the primary server and one of the secondary servers store the data updates, thereby effectively reducing resources needed for data storage.

BRIEF DESCRIPTION OF DRAWINGS

The accompanying drawings described here are intended to provide a further understanding of the present application, and constitute a part of the present application. The illustrative implementations of the present application and descriptions of the illustrative implementations are intended to describe the present application, and do not constitute limitations on the present application. The accompanying drawings include the following diagrams.

DESCRIPTION OF IMPLEMENTATIONS

Figure 1:
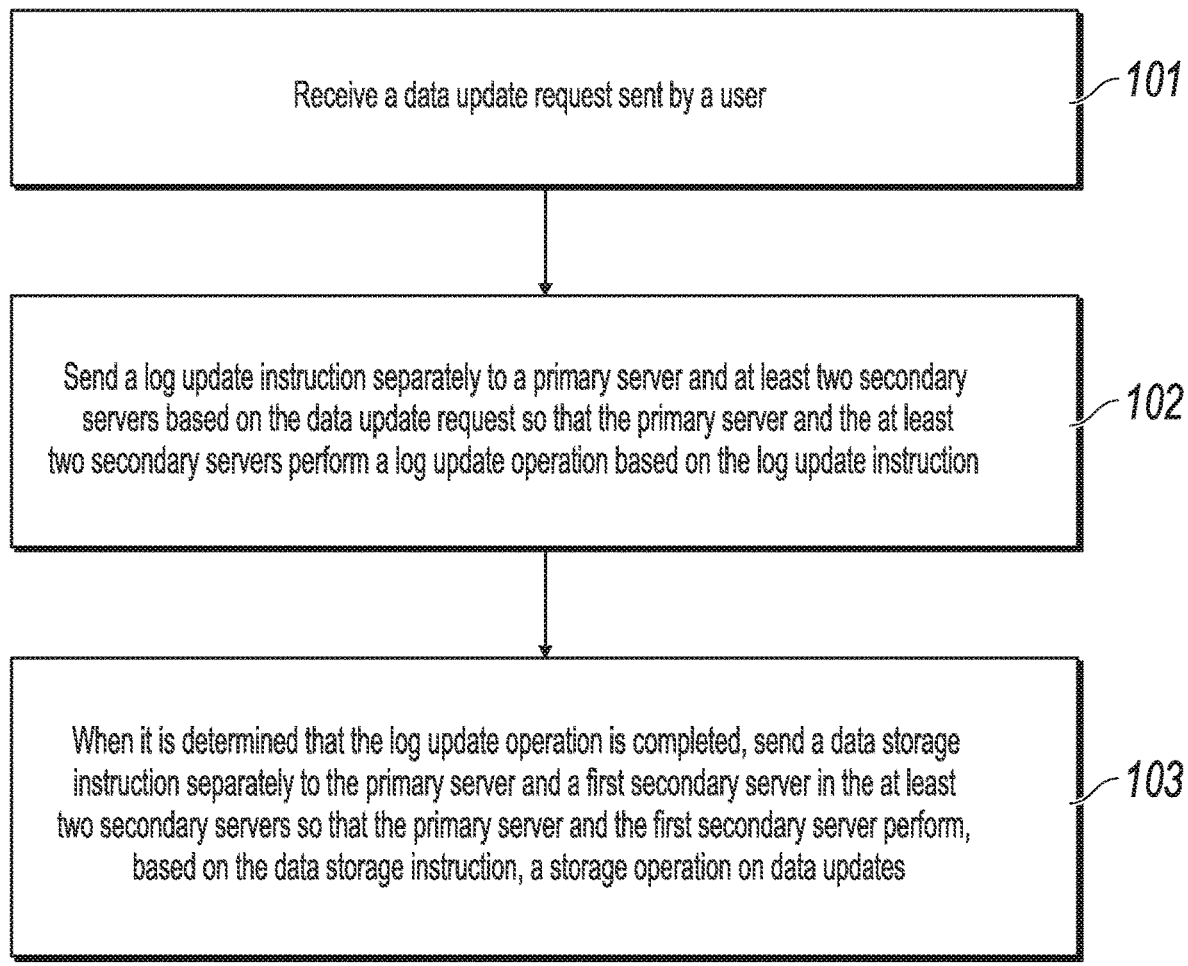
FIG. 1 is a schematic flowchart illustrating a data processing method, according to an implementation of the present application.

Usually, in a distributed database storage system, when receiving and storing data updates, a primary server can synchronously store, in a secondary server, the data updates. However, in practice, because the primary server and the secondary server are located in different areas, etc., there is a delay during data synchronization between the primary server and the secondary server. In other words, after the primary server completes storage of the data updates, the secondary server may have not completed storage of the data updates yet. As such, if the primary server fails, the secondary server may lose some data.

In the existing technology, to ensure that the secondary server does not lose data (to be specific, to ensure data consistency between the primary server and the secondary server), the data in the primary server can be synchronized to a plurality of (at least two) secondary servers. However, compared with the original distributed data storage system, a relatively large number of data copies need to be stored, which easily causes a waste of resources.

In the present disclosure, for the sake of system security, before storing the data updates, the primary server (or the secondary server) first performs log updating, and then the primary server (or the secondary server) stores the data updates. As such, consistency between the data stored in the primary server (or the secondary server) and the log can be ensured. When the primary server (or the secondary server) fails to store the data, the data can be restored by using the prestored log.

It can be seen that, in the distributed data storage system, before the primary server synchronizes the data updates, if the primary server and the secondary server first perform log updating and then store the data updates, when the data stored in the secondary server is lost, the lost data can be restored by using the prestored log. As such, log consistency between the primary server and the secondary server ensures data consistency between the primary server and the secondary server, so that the number of copies of the data updates can be reduced when the data is stored.

Based on the previous idea, in technical solutions provided in the present implementation of the present application, the number of copies of the data can be reduced while the data consistency between the primary server and the secondary server is ensured, thereby reducing the resources needed for data storage.

To achieve the purpose of the present application, implementations of the present application provide a data processing method and device. The method is applied to a distributed data storage system, and the distributed data storage system includes a primary server and at least two secondary servers. The method includes: receiving a data update request sent by a user, where the data update request includes data updates; sending a log update instruction separately to the primary server and the at least two secondary servers based on the data update request, so that the primary server and the at least two secondary servers perform a log update operation based on the log update instruction; and when it is determined that the log update operation is completed, sending a data storage instruction separately to the primary server and a first secondary server in the at least two secondary servers, so that the primary server and the first secondary server perform, based on the data storage instruction, a storage operation on the data updates.

When receiving the data update request, the distributed data storage system can send a log update instruction separately to the primary server and the secondary servers, so that the primary server and the secondary servers perform a log update operation, and send a data storage instruction to the primary server and one of the secondary servers when it is determined that the log update operation is completed. As such, when data in the secondary server is lost, the lost data can be restored by using the log prestored in the primary server and the secondary server, so as to ensure data consistency between the primary server and the secondary server, and only the primary server and one of the secondary servers store the data updates, thereby effectively reducing the resources needed for data storage.

It is worthwhile to note that the technical solutions provided in the present implementations of the present application can be based on a distributed consistency protocol and applied to a distributed data storage system based on the distributed consistency protocol. The distributed consistency protocol can be the Paxos protocol or other consistency protocols, which is not limited.

The distributed data storage system based on the distributed consistency protocol can include the primary server and the at least two secondary servers. The primary server can be configured to provide an external data read/write service, and after the primary server fails, the at least two secondary servers can provide the external data read/write service.

The following clearly and comprehensively describes the technical solutions in the present application with reference to the specific implementations of the present application and the corresponding accompanying drawings. The described implementations are merely some rather than all of the implementations of the present application. Other implementations obtained by a person of ordinary skill in the art based on the implementations of the present application without creative efforts shall fall within the protection scope of the present application.

The technical solutions provided in the implementations of the present application are described in detail below with reference to the accompanying drawings.

Implementation 1

FIG. 1 is a schematic flowchart illustrating a data processing method, according to an implementation of the present application. The method is described below. An execution body in the present implementation of the present application can be a distributed data storage system based on a distributed consistency protocol (hereinafter referred to as the distributed data storage system).

Step 101: Receive a data update request sent by a user.

The data update request includes data updates.

In step 101, after initiating a service request and receiving a response message, the user can send the data update request to the distributed data storage system. At this time, the distributed data storage system can receive the data update request sent by the user.

In the present implementation of the present application, the service request initiated by the user can be a payment request, a friend adding request, or another service request, which is not limited here.

The user sends the data update request to the distributed data storage system, the data update request can include the data updates, and the data update request is used to request the distributed data storage system to store the data updates.

For example, the user initiates a payment request on a payment platform, the payment platform can respond to the payment request sent by the user, and after receiving a response message, the user can send the data update request to the distributed data storage system. The data update request includes data that is related to the payment request and that is to be updated, and the data update request is used to request the distributed data storage system to store the data that is related to the payment request and that is to be updated.

Step 102: Send a log update instruction separately to the primary server and the at least two secondary servers based on the data update request, so that the primary server and the at least two secondary servers perform a log update operation based on the log update instruction.

In step 102, when receiving the data update request sent by the user, the distributed data storage system can send the log update instruction separately to the primary server and the at least two secondary servers in the distributed data storage system based on the data request, so that the primary server and the at least two secondary servers perform the log update operation based on the log update instruction.

It is worthwhile to note that, in practice, before the distributed data storage system receives the data update request, that is, when data stored in the distributed data storage system is empty, the distributed data storage system needs to determine a primary server, and the determined primary server provides the external data read/write service.

The primary server can be determined by the distributed data storage system based on a random rule, or the primary server can be determined, in an election (the election here can be election held by a plurality of servers based on the distributed consistency protocol) method, from the plurality of servers included in the distributed data storage system, or one server in the distributed data storage system can be selected as the primary server based on an actual case. The method for determining the primary server is not limited here.

After the primary server is determined, another server in the distributed data storage system can serve as the secondary server. In the present implementation of the present application, there are at least two secondary servers.

After determining the primary server and the secondary server, the distributed data storage system can send the log update instruction to the primary server when receiving the data update instruction, so that the primary server performs the log update operation based on the log update instruction.

When sending the log update instruction to the primary server, the distributed data storage system can synchronously send the log update instruction to the at least two secondary servers, so that the at least two secondary servers perform the log update operation based on the log update instruction.

It is worthwhile to note that, when the log update instruction is sent to the at least two secondary servers, the log update instruction can be sent to each of the at least two secondary servers; or several (at least two) secondary servers can be selected from the at least two secondary servers, and the log update instruction is sent to the selected several secondary servers, which is not limited.

For example, if the distributed data storage system includes two secondary servers, the log update instruction can be sent separately to the two secondary servers; or if the distributed data storage system includes four secondary servers, the log update instruction can be sent to two of the secondary servers, or the log update instruction can be sent to any three of the secondary servers, or the log update instruction can be further sent separately to the four secondary servers, which is not limited.

In the present implementation of the present application, to provide example description, the log update instruction can be sent to each of the at least two secondary servers.

When receiving the log update instruction, the primary server and the at least two secondary servers can perform the log update operation based on the log update instruction.

Step 103: When it is determined that the log update operation is completed, send a data storage instruction separately to the primary server and a first secondary server in the at least two secondary servers, so that the primary server and the first secondary server perform, based on the data storage instruction, a storage operation on the data updates.

In step 103, when determining that the log update operation is completed, the distributed data storage system can select one of the at least two secondary servers as the first secondary server, and send the data storage instruction separately to the primary server and the first secondary server, so that the primary server and the first secondary server store the data updates.

In the present implementation of the present application, at least in the following two cases, it can be determined that the log update operation is completed. The two cases are as follows:

The first case: when it is determined that the primary server completes the log update operation, it is determined that the log update operation is completed.

The second case: when it is determined that the primary server and at least one secondary server in the at least two secondary servers complete the log update operation, it is determined that the log update operation is completed.

In the first case, in practice, because the primary server is configured to provide the external data read/write service when determining whether the log update operation is completed, the distributed data storage system needs to first determine whether the primary server completes the log update operation, and can determine that the log update operation is completed when determining that the primary server completes the log update operation.

In the second case, to ensure log consistency between the primary server and the secondary server, after it is determined that the primary server completes the log update operation, it can be further determined whether the at least one secondary server completes the log update operation. At this time, if the at least one secondary server in the at least two secondary servers completes the log update operation, it can indicate log consistency between the primary server and the secondary server. In other words, it can be determined that the log update operation is completed.

As such, after it is determined that the log update operation is completed, one of the at least two secondary servers can be selected as the first secondary server, and the data storage instruction is sent separately to the primary server and the first secondary server, so that the primary server and the first secondary server perform the storage operation on the data updates.

In the present implementation of the present application, the data storage instruction can be sent separately to the primary server and the first secondary server in the at least two secondary servers based on the previous two cases.

In the first case, the data storage instruction is sent separately to the primary server and the first secondary server in the at least two secondary servers, which includes: when it is determined that the primary server completes the log update operation, sending the data storage instruction to the primary server, and after the data storage instruction is sent to the primary server and it is determined that the at least one server in the at least two secondary servers completes the log update operation, sending the data storage instruction to the first secondary server in the at least two secondary servers.

When it is determined that the primary server completes the log update operation, the data storage instruction can be sent to the primary server, and the primary server can receive the data storage instruction, and perform, based on the data storage instruction, the storage operation on the data updates.

At this time, it can be further determined whether the at least two secondary servers complete the log update operation. If at least one secondary server completes the log update operation, one of the at least two secondary servers can be selected as the first secondary server, and the data storage instruction is sent to the first secondary server.

In the second case, the data storage instruction is sent separately to the primary server and the first secondary server in the at least two secondary servers, which includes: when it is determined that the primary server and the at least one secondary server in the at least two secondary servers complete the log update operation, sending the data storage instruction separately to the primary server and the first secondary server in the at least two secondary servers.

When it is determined that the primary server and at least one secondary server in the at least two secondary servers complete the log update operation, one of the at least two secondary servers can be selected as the first secondary server, and the data storage instruction is sent separately to the primary server and the first secondary server.

It is worthwhile to note that, in the earlier described two cases, one secondary server can be randomly selected as the first secondary server from servers that receive the log update operation instructions, or one secondary server can be selected as the first secondary server based on an actual case, which is not limited.

After the distributed data storage system sends the data storage instruction separately to the primary server and the first secondary server in the at least two secondary servers, the primary server and the first secondary server can receive the data storage instruction, and perform, based on the data storage instruction, the storage operation on the data updates.

In practice, some secondary servers in the distributed data storage system that do not perform the storage operation on the data updates can be predetermined. As such, when receiving the data update request, the distributed data storage system cannot send the data storage instruction to these determined secondary servers.

Optionally, the method further includes: determining a second secondary server from the at least two secondary servers, and when it is determined that the second secondary server completes the log update operation, sending a null-operation instruction to the second secondary server, where the null-operation instruction is used to instruct the second secondary server to perform no operation.

In the present implementation of the present application, when being sent, the log update instruction can be sent separately to the at least two secondary servers. However, when it is determined that the log update operation is completed, the data storage instruction is sent to one of the at least two secondary servers. Therefore, the second secondary server can be determined from the at least two secondary servers, and when it is determined that the second secondary server completes the log update operation, the null-operation instruction is sent to the second secondary server, so that the second secondary server performs no operation. In other words, the second secondary server does not store the data updates. As such, the number of copies of the data updates can be reduced.

It is worthwhile to note that "second" in the second secondary server and "first" in the earlier described first secondary server are merely intended to distinguish different secondary servers, and do not have any other special meaning.

In the present implementation of the present application, when being determined, the second secondary server can be determined while the primary server is determined, or the second secondary server can be determined while the log update instruction is sent, or the second secondary server can be determined while the data storage instruction is sent, which is not limited.

As such, the at least two secondary servers can include one first secondary server and at least one second secondary server. For example, if the distributed data storage system includes two secondary servers, one first secondary server and one second secondary server are included; or if the distributed data storage system includes three secondary servers, one first secondary server and two second secondary servers are included.

When sending the data storage instruction, the distributed data storage system sends the data storage instruction to the primary server and the first secondary server only. As such, the primary server and the first secondary server store the data updates, and the second secondary server does not store the data updates, thereby reducing the resources needed for data storage.

In addition, in the present implementation of the present application, when any server (the primary server or the secondary server) in the distributed data storage system fails, the distributed data storage system can provide the external data read/write service while ensuring the data consistency between the primary server and the secondary server.

In the distributed data storage system, there are at least the following several fault cases:

The first fault case: the primary server fails.

The second fault case: the first secondary server fails.

The third fault case: the second secondary server fails.

Specific to the previous three fault cases, the following separately describes how the distributed data storage system provides the external data service while ensuring data consistency.

In the first fault case and the second fault case, the distributed data storage system performs the following operation: when it is determined that the primary server or the first secondary server fails, determining a third secondary server, and sending a data synchronization instruction to the third secondary server, so that the third secondary server completes, based on the data synchronization instruction, data synchronization with a server that does not fail and that stores the data.

In the first fault case, details are as follows:

When it is determined that the primary server fails, because the first secondary server stores data, the first secondary server can serve as a new primary server, and the first secondary server provides the external data read/write service. At this time, if a data loss occurs in the first secondary server, the lost data can be restored by using the log stored in the first secondary server and/or the log stored in the second secondary server.

In addition, data stored in the first secondary server further needs to be backed up. Therefore, a third secondary server needs to be determined, and the data stored in the first secondary server is backed up.

When the third secondary server is determined, one secondary server can be selected as the third secondary server from other secondary servers included in the at least two secondary servers, or a new server can be determined as the third secondary server, which is not limited.

After the third secondary server is determined, a data synchronization instruction can be sent to the third server, so that the third secondary server completes, based on the data synchronization instruction, data synchronization with a server that does not fail and that stores the data. Here, the server that does not fail and that stores the data can be the first secondary server, and the third secondary server completes the data synchronization with the first secondary server.

It is worthwhile to note that "third" in the third secondary server is intended for distinguishing from the first secondary server and the second secondary server, and has no other special meaning.

Optionally, to ensure log consistency among the first secondary server, the second secondary server, and the third secondary server based on the distributed consistency protocol, a log synchronization instruction can be further sent to the third secondary server, so that the third secondary server performs a log synchronization operation based on the log stored in the first secondary server.

In the second fault case, details are as follows:

When it is determined that the first secondary server fails, the primary server can still provide the external data service. However, because the first secondary server fails, a new secondary server needs to be determined, and data stored in the primary server is backed up.

The method for determining the new secondary server is the same as the earlier described method for determining the third secondary server. Details are omitted here for simplicity.

After the new secondary server is determined, a data synchronization instruction can be sent to the new secondary server, so that the new secondary server completes, based on the data synchronization instruction, data synchronization with a server that does not fail and that stores the data. Here, the server that does not fail and that stores the data can be the primary server, and the new secondary server completes the data synchronization with the primary server.

Optionally, to ensure log consistency among the primary server, the second secondary server, and the new secondary server based on the distributed consistency protocol, a log synchronization instruction can be further sent to the new secondary server, so that the new secondary server performs a log synchronization operation based on the log stored in the primary server.

In the third fault case, when it is determined that the second secondary server fails, determining a fourth secondary server, and sending a log synchronization instruction to the fourth secondary server, so that the fourth secondary server completes, based on the log synchronization instruction, log synchronization with a server that does not fail.

When it is determined that the second secondary server fails, the primary server can still provide the external data read/write service, and the first secondary server can back up the data stored in the primary server. However, at this time, to ensure log consistency between the primary server and the first secondary server based on the distributed consistency protocol, a fourth secondary server needs to be determined.

The method for determining the fourth secondary server is the same as the earlier described method for determining the third secondary server. Details are omitted here for simplicity.

After the fourth secondary server is determined, a log synchronization instruction can be sent to the fourth secondary server, so that after receiving the log synchronization instruction, the fourth secondary server completes, based on the log synchronization instruction, log synchronization with the server that does not fail.

Herein, the server that does not fail can be another server other than the second secondary server, or can be the primary server, the first secondary server, or another server that completes the log update operation, which is not limited.

"Fourth" in the fourth secondary server is intended for distinguishing from the first secondary server, the second secondary server, and the third secondary server, and has no other special meaning.

It is worthwhile to note that, because the second secondary server stores no data, after the fourth secondary server is determined, no data synchronization instruction needs to be sent to the fourth secondary server.

In the technical solutions provided in the present implementation of the present application, when the data update request is received, the log update instruction can be sent separately to the primary server and the secondary servers, so that the primary server and the secondary servers perform the log update operation, and the data storage instruction is sent to the primary server and one of the secondary servers when it is determined that the log update operation is completed. As such, when data in the secondary server is lost, the lost data can be restored by using the log prestored in the primary server and the secondary server, so as to ensure data consistency between the primary server and the secondary server, and only the primary server and one of the secondary servers store the data updates, thereby effectively reducing the resources needed for data storage.

Implementation 2

Figure 2:
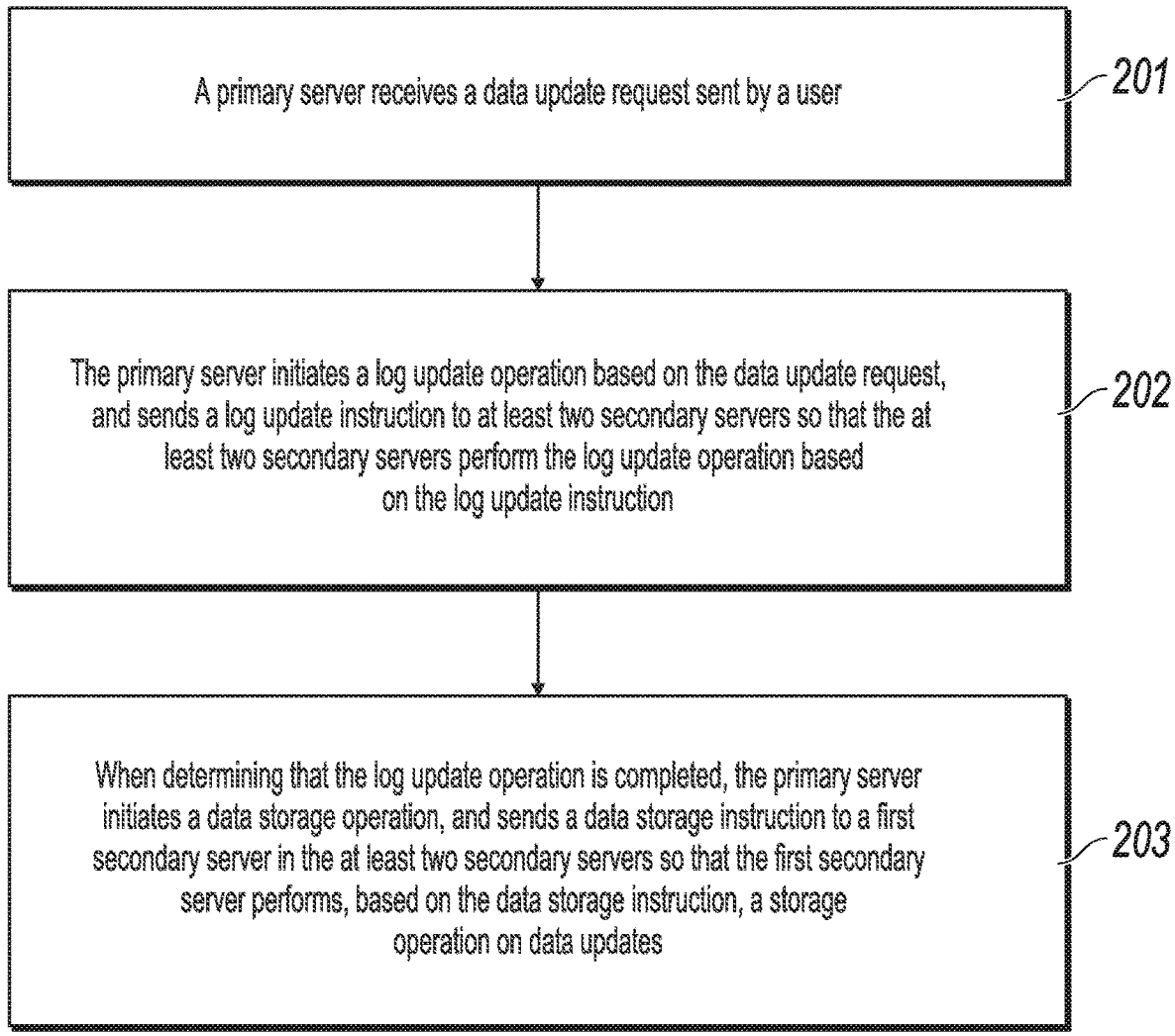
FIG. 2 is a schematic flowchart illustrating a data processing method, according to an implementation of the present application.

FIG. 2 is a schematic flowchart illustrating a data processing method, according to an implementation of the present application. The method is described below. An execution body of the present implementation of the present application can be a primary server in a distributed data storage system based on a consistency protocol.

Step 201: The primary server receives a data update request sent by a user.

The data update request includes data updates.

In step 201, after initiating a service request and receiving a response message, the user can send the data update request to the primary server in the distributed data storage system. At this time, the primary server in the distributed data storage system can receive the data update request sent by the user.

In the present implementation of the present application, the primary server is determined when the data stored in the distributed data storage system is empty. The method for determining the primary server is the same as the method described in the previous Implementation 1. Details are omitted here for simplicity.

Step 202: The primary server initiates a log update operation based on the data update request, and sends a log update instruction to the at least two secondary servers, so that the at least two secondary servers perform the log update operation based on the log update instruction.

In step 202, when receiving the data update request sent by the user, the primary server can initiate the log update operation, and send the log update instruction to the at least two secondary servers in the distributed data storage system based on the data request, so that the at least two secondary servers perform the log update operation based on the log update instruction.

When receiving the data update request, the primary server can initiate the log update operation based on the data update request, and further send the log update instruction to the at least two secondary servers based on the data update request; or when receiving the data update request, the primary server can send the log update instruction to the at least two secondary servers based on the data update request, and further initiate the log update operation based on the data update request, which is not limited.

After the primary server sends the log update instruction to the at least two secondary servers, the at least two secondary servers can receive the log update instruction, and perform the log update operation based on the log update instruction.

Step 203: When determining that the log update operation is completed, the primary server initiates a data storage operation, and sends a data storage instruction to a first secondary server in the at least two secondary servers, so that the first secondary server performs, based on the data storage instruction, a storage operation on the data updates.

In step 203, when determining that the log update operation is completed, the primary server can initiate the data storage operation, select one of the at least two secondary servers as a first secondary server, and send the data storage instruction to the first secondary server, so that the primary server and the first secondary server store the data updates.

The primary server can determine, at least in the following two cases, that the log update operation is completed. The two cases are as follows:

The first case: when it is determined that the primary server completes the log update operation, it is determined that the log update operation is completed.

The second case: when it is determined that the primary server and at least one secondary server in the at least two secondary servers complete the log update operation, it is determined that the log update operation is completed.

After determining that the log update operation is completed, the primary server can initiate the data storage operation, so that the primary server provides an external data read/write service. At this time, the primary server can further select one of the at least two secondary servers as a first secondary server, and send the data storage instruction to the first secondary server, so that the first secondary server performs, based on the data storage instruction, the data storage operation on the data updates.

The primary server can initiate the data storage operation before sending the data storage instruction, or can initiate the data storage operation after sending the data storage instruction, which is not limited.

As such, after receiving the data update request, the primary server can send the log update instruction to the first secondary server and the second secondary server, and when determining that the log update operation is completed, the primary server performs the data storage operation, and sends the data storage instruction to the first secondary server. As such, when data in the first secondary server is lost, the lost data can be restored based on the log prestored in the primary server, and/or the log prestored in the first secondary server, and/or the log prestored in the second secondary server, so as to ensure data consistency between the primary server and the first secondary server. In addition, only the primary server and the first secondary server store the data updates, thereby reducing the resources needed for data storage.

Implementation 3

A distributed data storage system includes three servers (one primary server and two secondary servers) is used as example description of technical solutions provided in the present implementation of the present application below. An execution body of the present implementation of the present application can be a primary server.

Step 1: Determine the primary server, a first secondary server, and a second secondary server from the distributed data storage system.

When data stored in the distributed data storage system is empty, the primary server and the two secondary servers can be determined from the distributed data storage system. For ease of distinguishing, the two secondary servers can be respectively referred to as the first secondary server and the second secondary server.

In the present implementation of the present application, the primary server can store the data updates, and provide an external data read/write service. The first secondary server can store the data updates, and the second secondary server does not store the data updates.

In the present implementation of the present application, a sequence of determining the primary server, the first secondary server, and the second secondary server is not limited.

Example description of a determining sequence of the second secondary server, the primary server, and the first secondary server is used below.

First, the second secondary server is determined.

When being determined, the second secondary server can be determined based on a distributed consistency protocol, namely, the Paxos protocol, in a method of election held by the three servers included in the distributed data storage system.

For example, one server can be randomly selected as the second secondary server or the second secondary server is determined based on an actual case. Here, a method for determining the second secondary server is not limited.

Second, the primary server is determined.

After the second secondary server is determined, the primary server can be determined based on a distributed consistency protocol, namely, the Paxos protocol, or in a method of election held by the second secondary server and remaining two servers in the distributed data storage system.

It is worthwhile to note that, when the primary server is determined in the method of election, neither the second secondary server nor the other two servers can elect the second secondary server as the primary server.

Figure 3:
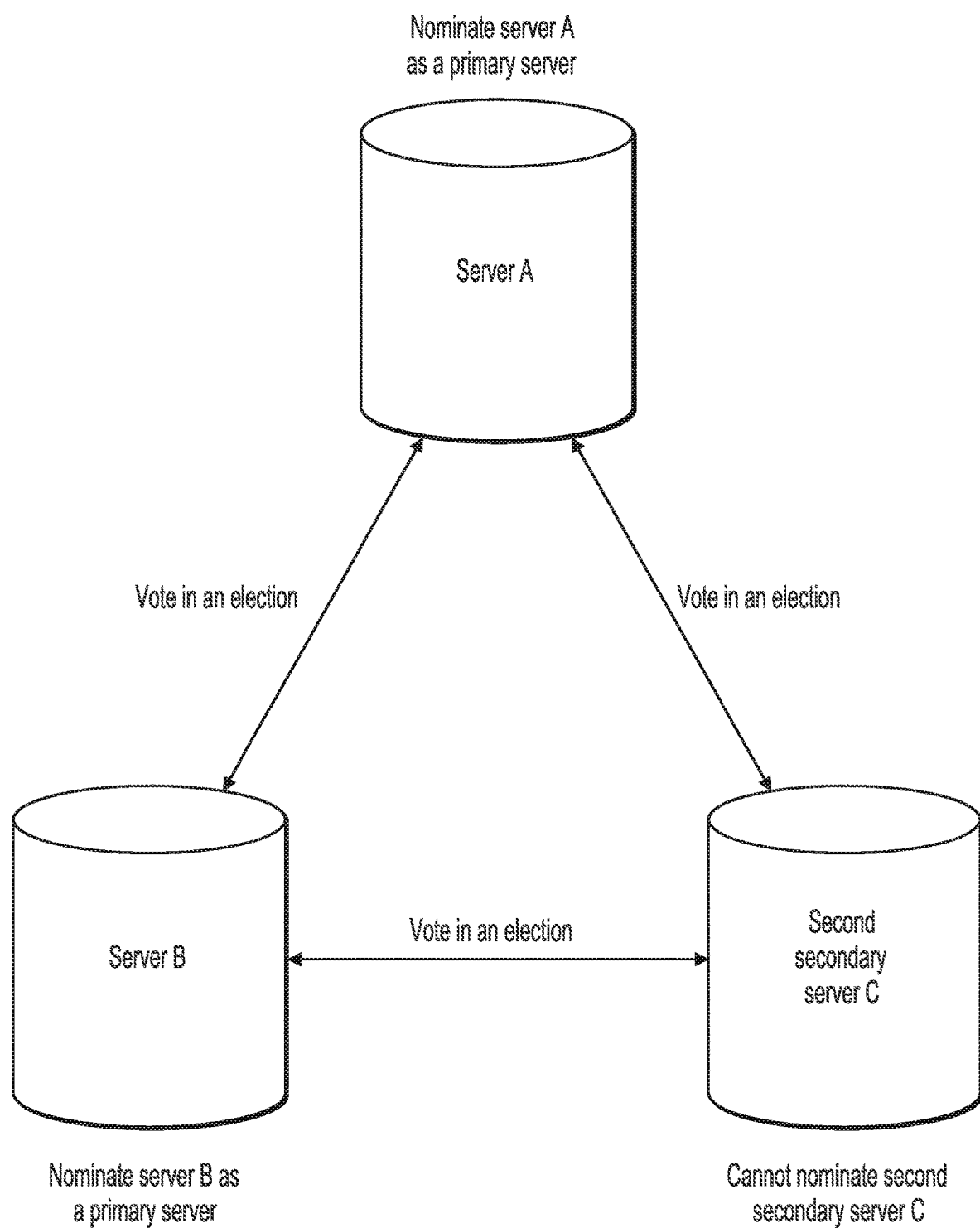
FIG. 3 is a schematic diagram illustrating a primary server determining procedure, according to an implementation of the present application.

Referring to FIG. 3, FIG. 3 is a schematic diagram illustrating a primary server determining procedure, according to an implementation of the present application.

It can be seen from FIG. 3 that after the second secondary server C is determined in the method of election, server A, server B, and the second secondary server C can determine the primary server in the method of election. Server A can elect server A or server B as the primary server, but cannot elect the second secondary server C as the primary server. Server B can elect server B or server A as the primary server, but cannot elect the second secondary server C as the primary server. The second secondary server C cannot elect the second secondary server C as the primary server, but can elect server A or server B as the primary server.

When determining the primary server, one of the two servers other than the second secondary server can be randomly selected as the primary server, or one server can be selected as the primary server based on an actual case, which is not limited.

Finally, the first secondary server is determined.

After the second secondary server and the primary server are determined from the three servers included in the distributed data storage system, the remaining server can serve as the first secondary server.

Step 2: The primary server receives a data update request sent by a user.

The data update request includes data updates.

Step 3: The primary server sends a log update instruction to the first secondary server and the second secondary server, so that the first secondary server and the second secondary server perform a log update operation based on the log update instruction.

After the primary server sends the log update instruction to the first secondary server and the second secondary server, the first secondary server and the second secondary server can receive the log update instruction. At this time, the primary server, the first secondary server, and the second secondary server can perform log updating based on the distributed consistency protocol, namely, the Paxos protocol. When it is determined that the primary server and at least one of the first secondary server and the second secondary server complete the log update operation, it is determined that the log update operation is completed.

Step 4: The primary server sends a data storage instruction to the first secondary server, so that the first secondary server performs, based on the data storage instruction, a storage operation on the data updates.

When determining that the log update operation is completed, the primary server can perform the storage operation on the data updates, and send the data storage instruction to the first secondary server. The first secondary server can receive the data storage instruction. At this time, if the first secondary server has completed the log update operation, the first secondary server can perform, based on the data storage instruction, the storage operation on the data updates; or if the first secondary server has not completed the log update operation, the first secondary server needs to continue performing the log update operation, and when completing the log update operation, the first secondary server can perform, based on the received data storage instruction, the storage operation on the data updates.

As such, when receiving the data update request, the primary server can send the log update instruction to the first secondary server and the second secondary server, and when determining that the log update operation is completed, the primary server performs the data storage operation, and sends the data storage instruction to the first secondary server. As such, only the primary server and the first secondary server store the data updates, thereby reducing the resources needed for data storage.

In the present implementation of the present application, when any one of the primary server, the first secondary server, and the second secondary server fails, the distributed data storage system can provide an external data read/write service while ensuring data consistency.

Figure 4:
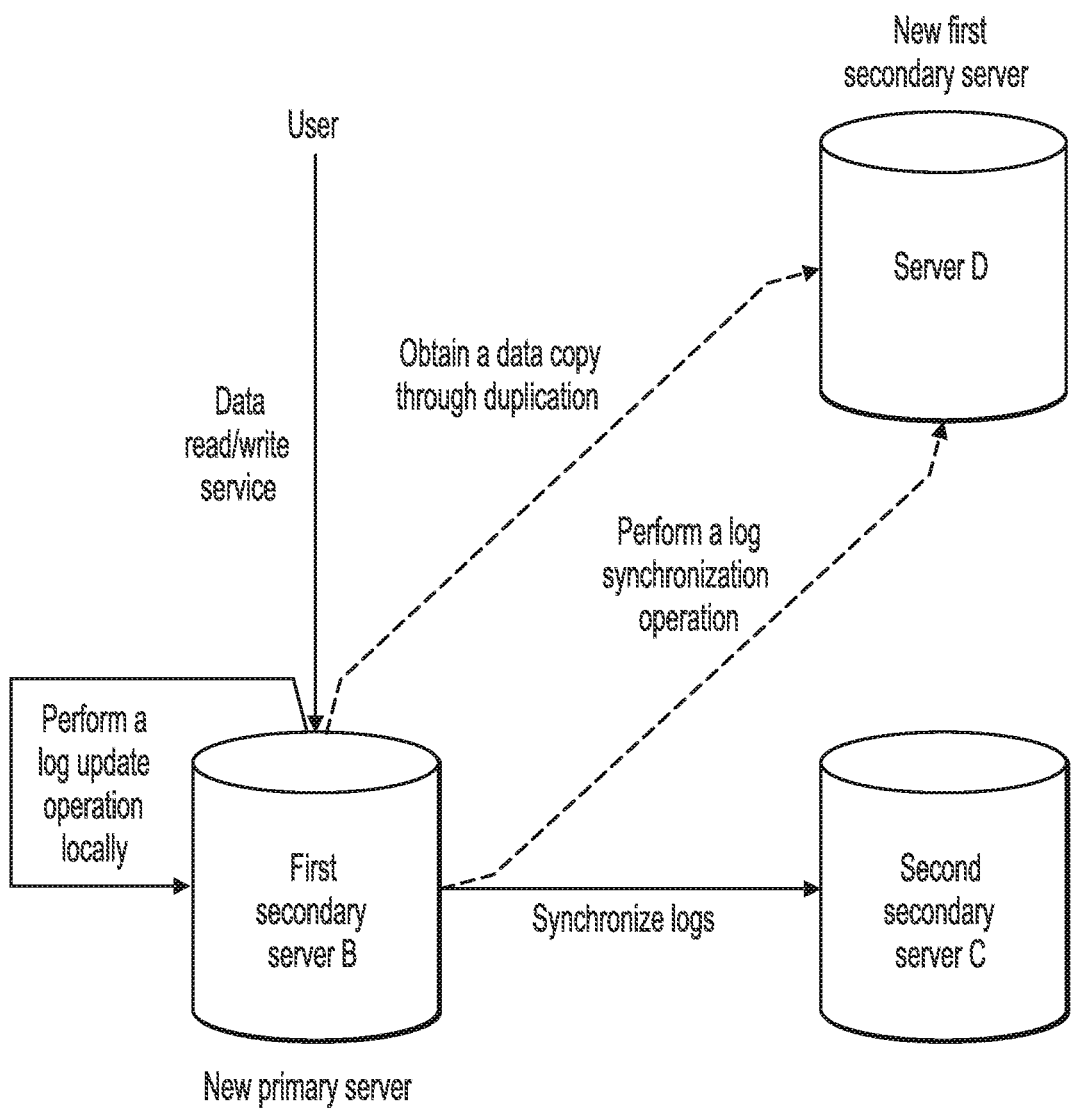
FIG. 4 is a schematic structural diagram illustrating server troubleshooting, according to an implementation of the present application.

When the primary server fails, details are as follows:

As shown in FIG. 4, when the primary server fails, the primary server cannot continue providing the read/write service for a user, and at this time, the first secondary server B can be determined as a new primary server, and server D is determined as the new first secondary server. The first secondary server B can provide the data read/write service for the user, and maintain log synchronization with the second secondary server C. Server D obtains a data copy through duplication from the first secondary server B to complete data synchronization with the first secondary server B, and server D performs the log synchronization operation to complete log synchronization with the first secondary server B.

Figure 5:
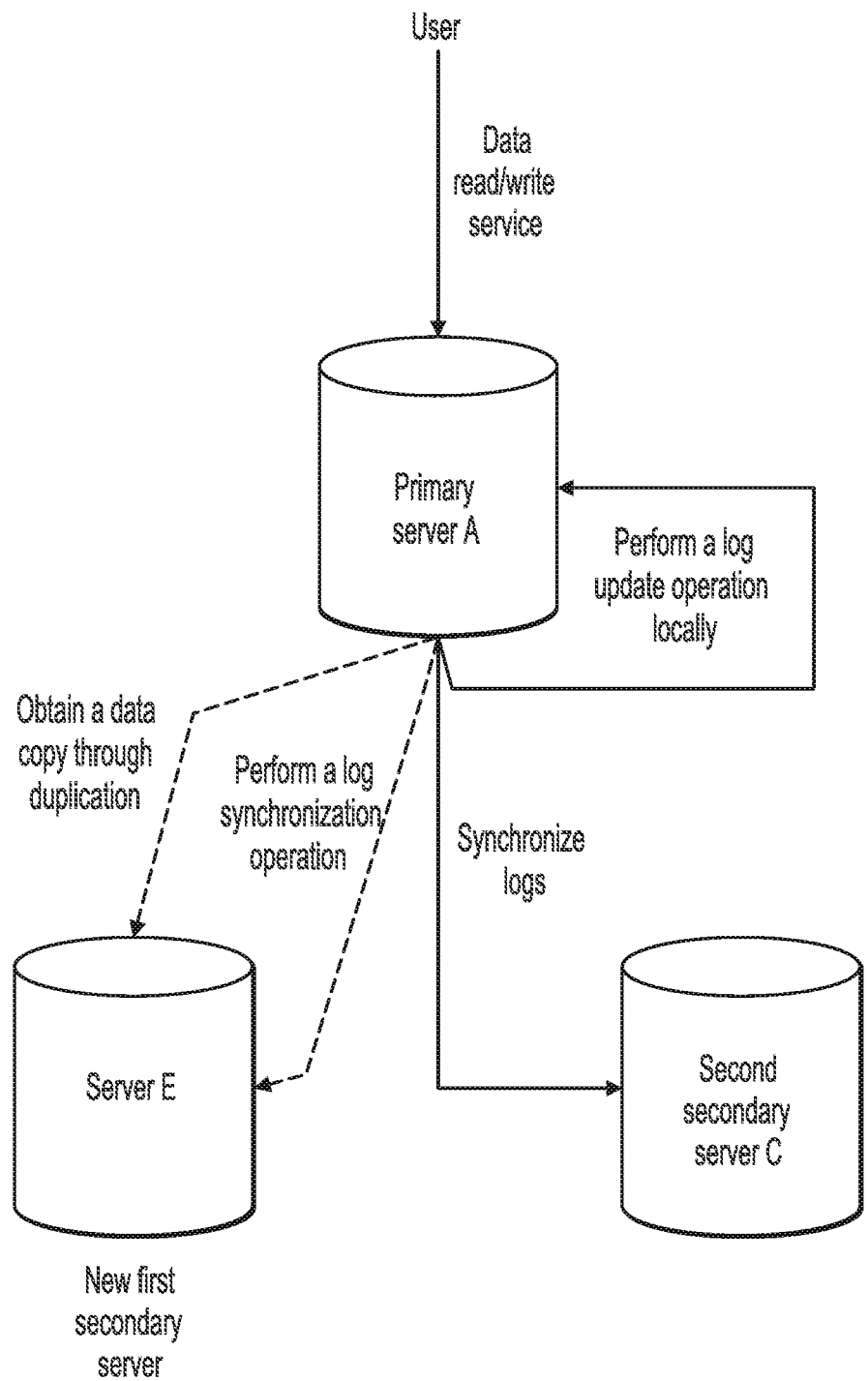
FIG. 5 is a schematic structural diagram illustrating server troubleshooting, according to an implementation of the present application.

When the first secondary server fails, details are as follows:

As shown in FIG. 5, when the first secondary server fails, primary server A can continue providing the data read/write service for the user. At this time, server E can be determined as the new first secondary server. Server E obtains a data copy through duplication from primary server A to complete data synchronization with primary server A, and server E performs the log synchronization operation to complete log synchronization with primary server A.

Figure 6:
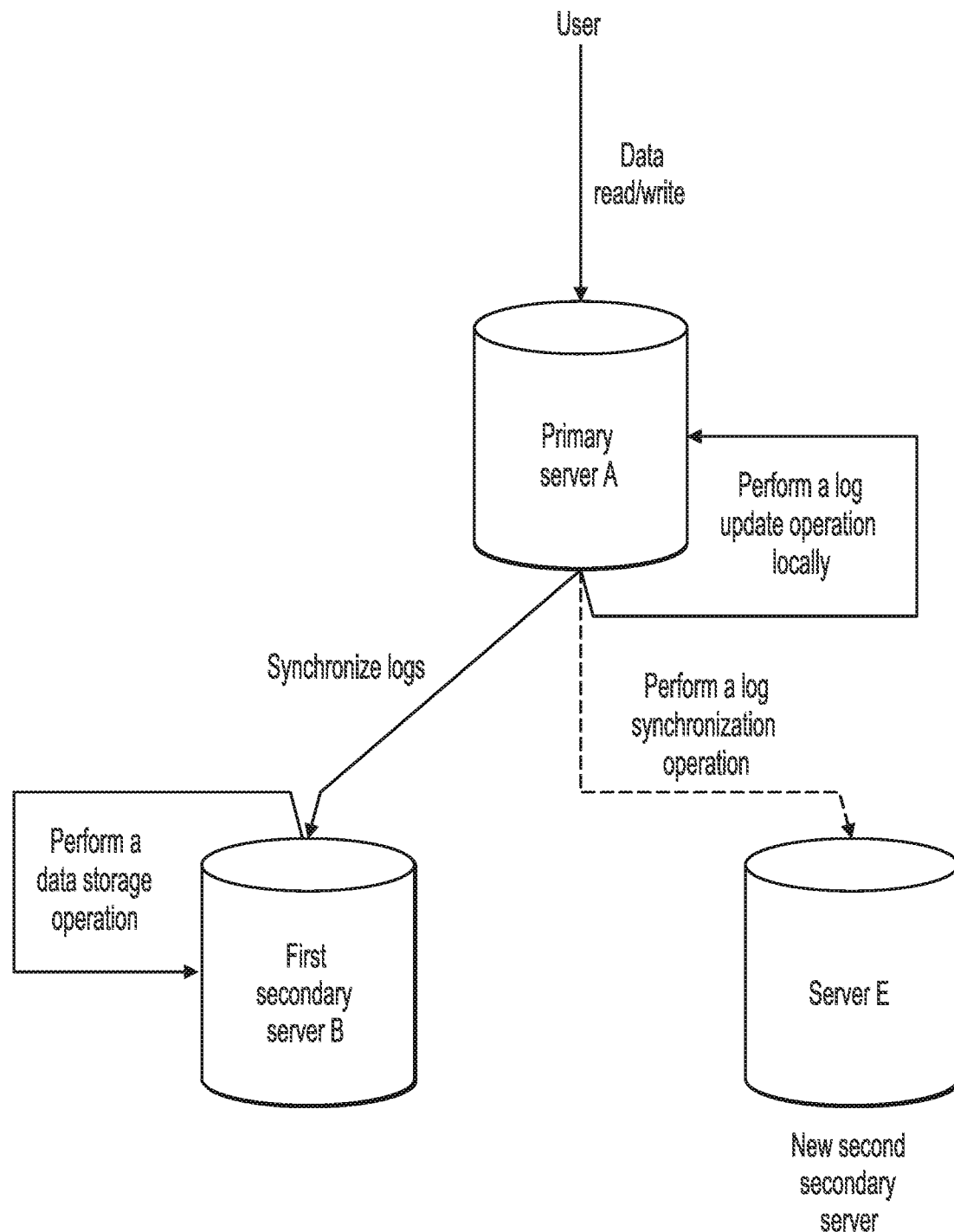
FIG. 6 is a schematic structural diagram illustrating server troubleshooting, according to an implementation of the present application.

When the second secondary server fails, details are as follows:

As shown in FIG. 6, when the second secondary server fails, primary server A can continue providing the data read/write service for the user. At this time, server F can be determined as the new second secondary server, and server F performs the log synchronization operation to complete log synchronization with primary server A.

In practice, there can be remote distributed data storage system. In other words, for the same data, in addition to local storage of a data copy, remote storage of data copies can be maintained, so as to enhance stability of the distributed data storage system. For the remote distributed data storage system, to reduce the resources needed for data storage, at least three servers can be used locally, the primary server stores the data updates, and the other secondary servers store only the log (that is, the other secondary servers perform only the log update operation); and at least three servers are used remotely, the primary server stores a data copy of data in the local primary server, and the other secondary servers store only the log (that is, the other secondary servers perform only the log update operation).

Figure 7:
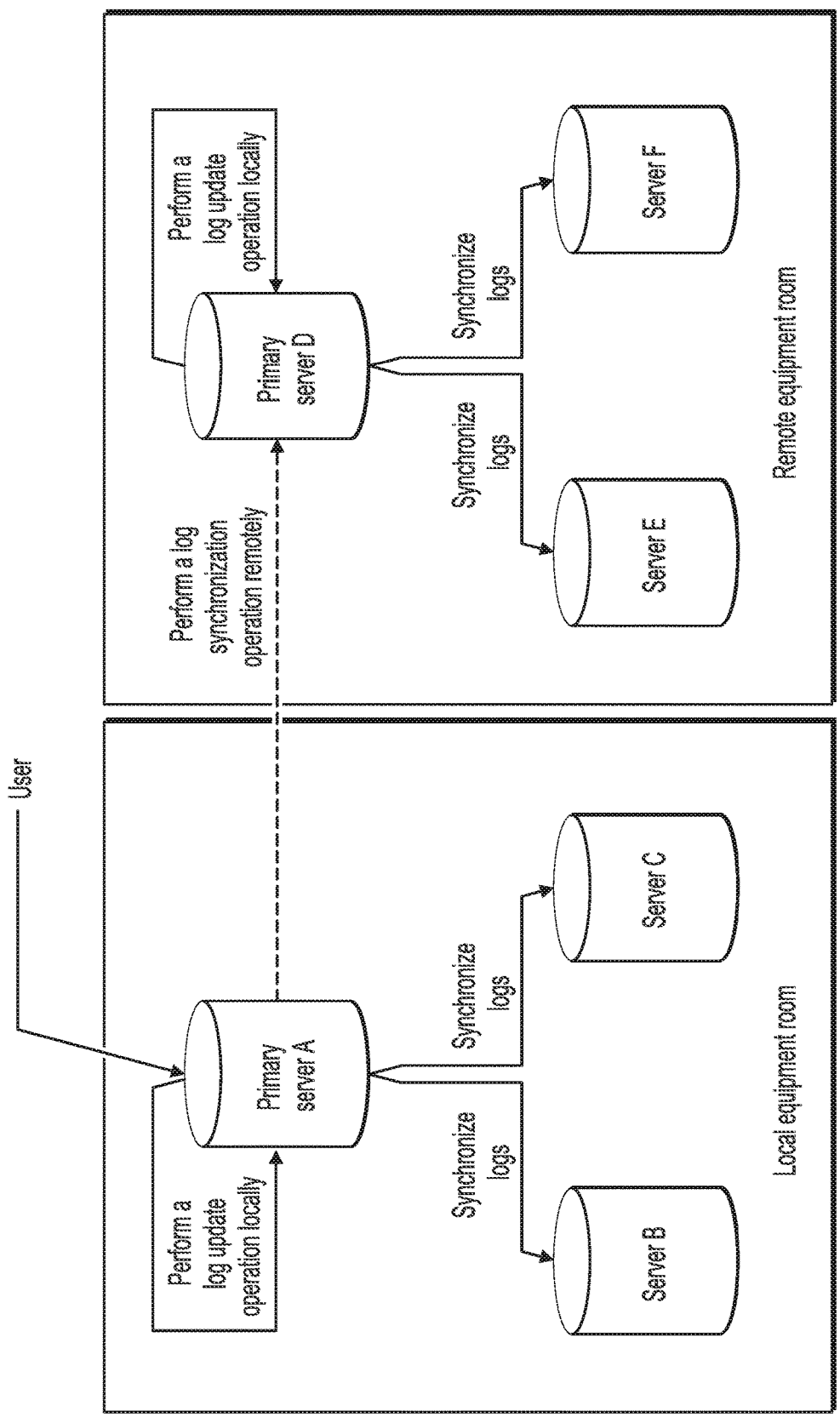
FIG. 7 is a schematic structural diagram of a server in a local equipment room and a server in a remote equipment room, according to an implementation of the present application.

As shown in FIG. 7, in a local equipment room, three servers labeled A, B, and C can be used, server A is the primary server and stores the data updates, and server B and server C are the secondary servers and perform only the log update operation, but do not store the data updates. In a remote equipment room, servers D, E, and F can be used, server D is the primary server and stores a data copy of data stored in server A in the local equipment room, and server E and server F perform only the log update operation, but do not store the data updates.

When server A fails, server D can provide the external data read/write service.

When server D fails, server A can still continue providing the external data read/write service. At this time, a new primary server needs to be determined in the remote equipment room. The new primary server can complete data synchronization and log synchronization with server A.

When any one of server B, server C, server E, and server F fails, server A can still continue providing the external read/write service.

Figure 8:
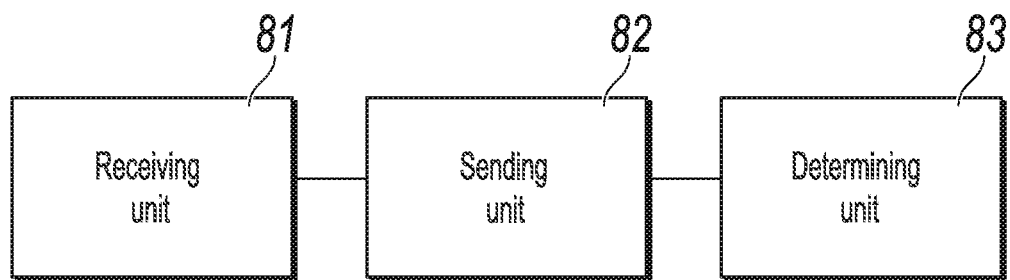
FIG. 8 is a schematic structural diagram illustrating a data processing device, according to an implementation of the present application.

FIG. 8 is a schematic structural diagram illustrating a data processing device, according to an implementation of the present application. The device is applied to the distributed data storage system, the distributed data storage system includes a primary server and at least two secondary servers, and the device includes a receiving unit 81, a sending unit 82, and a determining unit 83.

The receiving unit 81 is configured to receive a data update request sent by a user, where the data update request includes data updates.

The sending unit 82 is configured to send a log update instruction separately to the primary server and the at least two secondary servers based on the data update request, so that the primary server and the at least two secondary servers perform a log update operation based on the log update instruction.

When determining that the log update operation is completed, the sending unit 82 is configured to send a data storage instruction separately to the primary server and a first secondary server in the at least two secondary servers, so that the primary server and the first secondary server perform, based on the data storage instruction, a storage operation on the data updates.

The sending unit 82 determines that the log update operation is completed, which includes: when it is determined that the primary server completes the log update operation, determining that the log update operation is completed; or when it is determined that the primary server and at least one secondary server in the at least two secondary servers complete the log update operation, determining that the log update operation is completed.

The sending unit 82 sends the data storage instruction separately to the primary server and the first secondary server in the at least two secondary servers, which includes: when it is determined that the primary server completes the log update operation, sending the data storage instruction to the primary server, and after the data storage instruction is sent to the primary server and it is determined that the at least one server in the at least two secondary servers completes the log update operation, sending the data storage instruction to the first secondary server in the at least two secondary servers; or when it is determined that the primary server and the at least one secondary server in the at least two secondary servers complete the log update operation, sending the data storage instruction separately to the primary server and the first secondary server in the at least two secondary servers.

Optionally, the data processing device further includes the determining unit 83.

The determining unit 83 is configured to determine a second secondary server from the at least two secondary servers, and send a null-operation instruction to the second secondary server when determining that the second secondary server completes the log update operation, where the null-operation instruction is used to instruct the second secondary server to perform no operation.

Optionally, when determining that the primary server or the first secondary server fails, the determining unit 83 is configured to determine a third secondary server, and send a data synchronization instruction to the third secondary server, so that the third secondary server completes, based on the data synchronization instruction, data synchronization with a server that is not faulty and that stores the data.

Optionally, when determining that the second secondary server fails, the determining unit 83 is configured to determine a fourth secondary server, and send a log synchronization instruction to the fourth secondary server, so that the fourth secondary server completes, based on the log synchronization instruction, log synchronization with the server that is not faulty.

Figure 9:
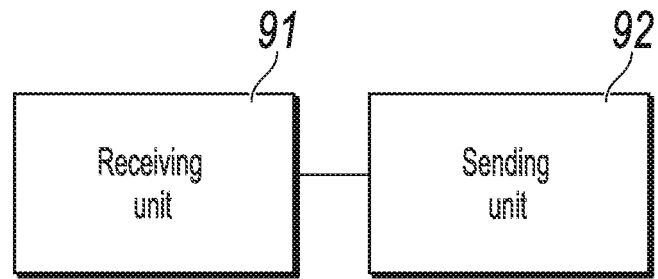
FIG. 9 is a schematic structural diagram illustrating a data processing device, according to an implementation of the present application.

FIG. 9 is a schematic structural diagram illustrating a data processing device, according to an implementation of the present application. The device is applied to the distributed data storage system, the distributed data storage system includes a primary server and at least two secondary servers, and the device includes a receiving unit 91 and a sending unit 92.

The receiving unit 91 is configured to receive a data update request sent by a user, where the data update request includes data updates.

The sending unit 92 is configured to initiate a log update operation based on the data update request, and send a log update instruction to the at least two secondary servers, so that the at least two secondary servers perform the log update operation based on the log update instruction.

When determining that the log update operation is completed, the sending unit 92 is configured to initiate a data storage operation, and send a data storage instruction to a first secondary server in the at least two secondary servers, so that the first secondary server performs, based on the data storage instruction, a storage operation on the data updates.

A person skilled in the art should understand that the implementations of the present application can be provided as a method, a system, or a computer program product. Therefore, the present application can use hardware only implementations, software only implementations, or implementations with a combination of software and hardware. In addition, the present application can use a form of a computer program product that is implemented on one or more computer-usable storage media (including but not limited to a magnetic disk memory, a CD-ROM, an optical memory, etc.) that include computer-usable program code.

The present application is described with reference to the flowcharts and/or block diagrams of the method, the device (system), and the computer program product according to the implementations of the present application. It should be understood that computer program instructions can be used to implement each procedure and/or each block in the flowcharts and/or the block diagrams and a combination of a procedure and/or a block in the flowcharts and/or the block diagrams. These computer program instructions can be provided for a general-purpose computer, a dedicated computer, a built-in processor, or a processor of another programmable data processing device to generate a machine, so that the instructions executed by the computer or the processor of another programmable data processing device are used to generate an apparatus for implementing a function specified in one or more procedures in the flowcharts and/or in one or more blocks in the block diagrams.

These computer program instructions can be stored in a computer readable memory that can instruct the computer or the another programmable data processing device to work in a specific way, so that the instructions stored in the computer readable memory are used to generate an artifact that includes an instruction apparatus. The instruction apparatus implements a function specified in one or more procedures in the flowcharts and/or in one or more blocks in the block diagrams.

These computer program instructions can be loaded onto the computer or another programmable data processing device, so that a series of operations and steps are performed on the computer or another programmable device, thereby generating computer-implemented processing. Therefore, the instructions executed on the computer or another programmable device provide steps for implementing a function specified in one or more procedures in the flowcharts and/or in one or more blocks in the block diagrams.

In a typical configuration, a computing device includes one or more processors (CPUs), an input/output interface, a network interface, and a memory.

The memory may include a non-persistent memory, a RAM, a non-volatile memory, and/or another form in a computer readable medium, for example, a ROM or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. A computer storage medium includes but is not limited to a phase-change random access memory (PRAM), a static RAM (SRAM), a dynamic RAM (DRAM), a random access memory (RAM) of another type, a read-only memory (ROM), an electrically erasable programmable read-only memory (EEPROM), a flash memory or another memory storage device, a compact disc read-only memory (CD-ROM), a digital versatile disc (DVD), or another optical memory, a cassette, a magnetic disk, or another magnetic storage device or any other non-transmission medium. The computer storage medium can be configured to store information accessible to a computing device. Based on the description in the present specification, the computer readable medium does not include computer readable transitory media such as a modulated data signal and a carrier.

It is further worthwhile to note that, the term "include", "comprise", or any other variant is intended to cover non-exclusive inclusion, so that a process, a method, a commodity, or a device that includes a series of elements not only includes these elements, but also includes other elements that are not expressly listed, or further includes elements inherent to such process, method, commodity, or device. An element preceded by "includes a . . . " does not, without more constraints, exclude the existence of additional identical elements in the process, method, commodity, or device that includes the element.

A person skilled in the art should understand that the implementations of the present application can be provided as a method, a system, or a computer program product. Therefore, the present application can use hardware only implementations, software only implementations, or implementations with a combination of software and hardware. In addition, the present application can use a form of a computer program product that is implemented on one or more computer-usable storage media (including but not limited to a magnetic disk memory, a CD-ROM, an optical memory, etc.) that include computer-usable program code.

The previous descriptions are merely implementations of the present application, and are not intended to limit the present application. A person skilled in the art can make various modifications and changes to the present application. Any modifications, equivalent replacements, improvements, etc. made within the spirit and principle of the present application shall fall within the protection scope of the claims of the present application.

Figure 10:
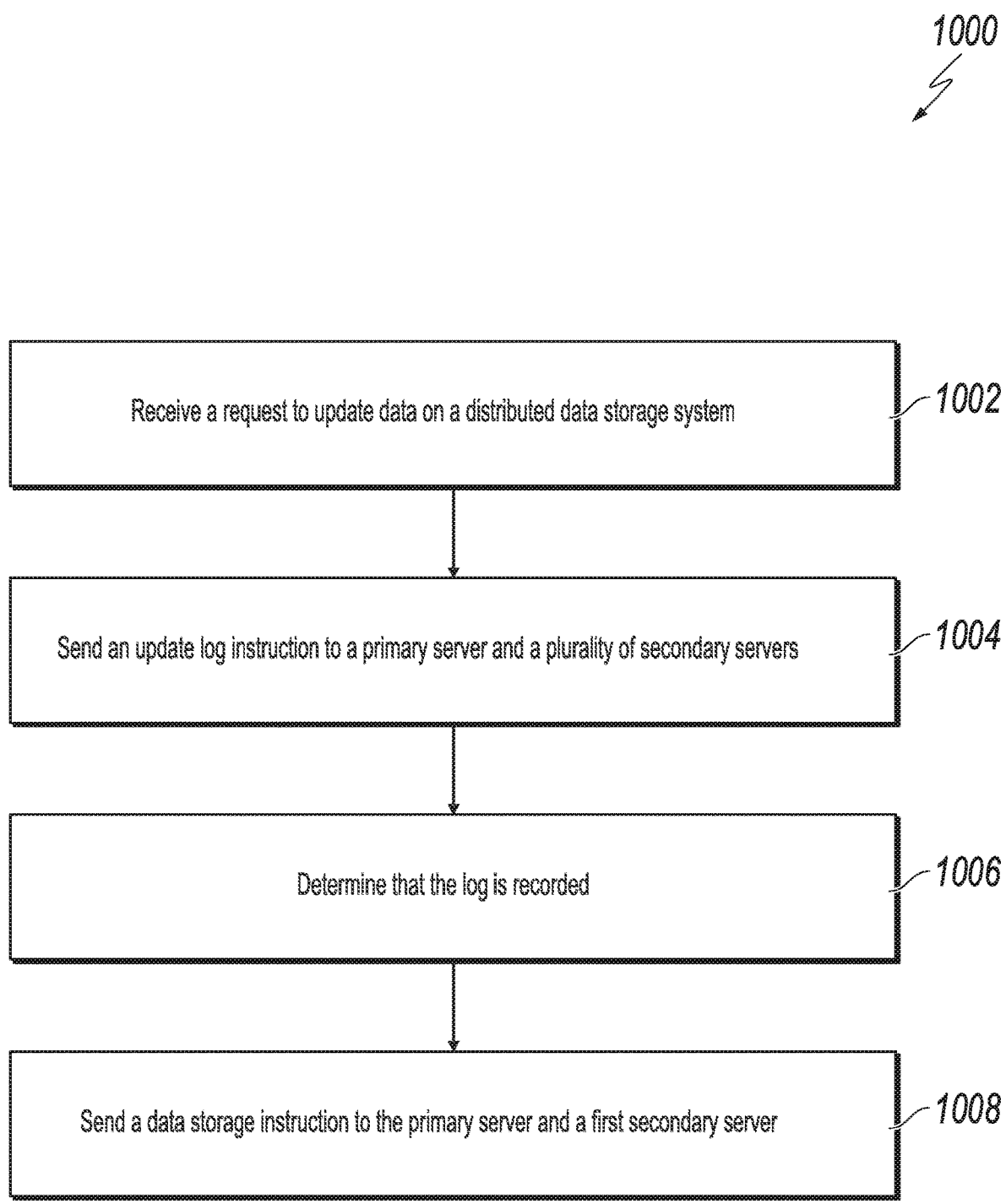
FIG. 10 is a flowchart illustrating an example of a computer-implemented method for storing data on a distributed data storage system, according to an implementation of the present disclosure.

FIG. 10 is a flowchart illustrating an example of a computer-implemented method 1000 for storing data on a distributed data storage system, according to an implementation of the present disclosure. For clarity of presentation, the description that follows generally describes method 1000 in the context of the other figures in this description. However, it will be understood that method 1000 can be performed, for example, by any system, environment, software, and hardware, or a combination of systems, environments, software, and hardware, as appropriate. In some implementations, various steps of method 1000 can be run in parallel, in combination, in loops, or in any order.

At 1002, a request to update data stored on a distributed data storage system is received. The request can be received from a computing device that is outside the distributed storage system and can include data updates. For example, a user may use a computing device to submit a request to deposit money into an account that is stored on a distributed data storage system.

The distributed data storage system can include a plurality of servers. A primary server of the plurality of servers can be in communication with the external computing device to receive or send (read and/or write) data from or to the external device. The distributed storage system can also include a plurality of secondary servers that can support the primary server in storing or restoring the data, as described herein. The primary and/or the secondary servers can be determined based on a distribution consistency protocol such as Paxos protocol. In some implementations, particular primary and/or the secondary servers are determined to handle the services that are being provided to particular computing devices. In some implementations, the primary server associated with a particular computing device is selected randomly. From 1002, the method 1000 proceeds to 1004.

At 1004, an update log instruction is sent to a primary server and a plurality of secondary servers of the distributed storage system so that each of the primary server and the plurality of the secondary servers records a log associated with the request. The log can include an identification information of the data updates, a date and time of the request, or any other information that distinguishes the request and/or the data updates from other updates that are made to the data stored on the distributed storage system. For example, the primary and/or the secondary servers may keep lists or logs associated with the updates made on the data stored on the distributed system, and at 1004, an update log instruction may instruct such servers to update their respective lists to include the new request received on 1002. In some implementations, the distributed storage system includes one or more master servers that send instructions such as the update log instruction, to the other servers. In some implementations, the primary server sends the update log instruction. In these implementations, sending the instruction to the primary server is equivalent to performing the instructions on the primary server. From 1004, method 1000 proceeds to 1006.

At 1006, it is determined as to whether the log is recorded. Such determination may be done by sending an inquiry to the servers to which the update log instruction was sent and/or by receiving a confirmation message from at least one of such servers. In some implementations, determining that the log has been recorded includes determining that the log has been recorded on the primary server, for example, by receiving a confirmation message from the primary server. In some implementations, determining that the log has been recorded includes determining that the log has been recorded on the primary server and at least one secondary server to which the log update instruction was sent. From 1006, method 1000 proceeds to 1008.

At 1008, a data storage instruction is sent to the primary server and a first secondary server of the plurality of secondary servers so that each of the primary server and the first secondary serer stores the data updates. The first secondary server can be a secondary server that is selected as a back up to the primary server for storing the data updates. The first secondary server can be selected from the plurality of secondary servers randomly or based on one or more criteria, such as processing speed, memory space, delays is storing data as compared to the primary server, etc.

In some implementations, the log needs to be recorded on at least one second secondary server that is different from the first secondary server. The second secondary server may be selected randomly, or based on one or more criteria, such as speed, memory space, etc. In some implementations, in response to determining that the second secondary server has recorded the log, a null-operation instruction is sent to the second secondary server. The null-operation instruction instructs the second secondary server to perform no operation with respect to the data updates.

The log recorded on the second secondary server can be used to synchronize the data that is stored on the primary and the first secondary servers. For example, when the primary server fails, the first secondary server can rely on the log recorded on the second secondary server to make sure that the first secondary server has recorded the correct data updates and has not missed any data updates due to, for example, a delay between the primary and the first secondary server. For example, when there are three data updates A, B, and C to be made, and the primary server fails while the first secondary server has stored only the data updates A and B, the first secondary server can rely on the log of the second secondary server and determine that the first secondary server still needs to store the data update C. In this case, the first secondary server can make a copy of the data update C from a server that has a copy of the data update C, or from the primary server (if C has already been recorded on the primary server). Alternatively or in addition, the first secondary server can inquire the data update C from the external computing device.

When it is determined that the primary server or the first secondary server is failed, a data synchronization instruction is sent to a third secondary server so that the third secondary server synchronizes with a server that is not failed, to store the data updates. For example, when the first secondary server is failed, the third secondary server can synchronize with the primary server, and when the primary server is failed, the third secondary server can synchronize with the first secondary server to store the data updates. When the primary server fails, the first secondary server can become the new primary server and perform the external read/write services, and the third secondary server can perform as a backup to the new primary server. Similar to the first secondary server, the third secondary server can be selected from the plurality of secondary servers randomly, or according to one or more criteria.

When it is determined that a second secondary server that has recorded the log is failed, a log synchronization instruction can be sent to another server (e.g., to a fourth secondary server) so that the other server synchronizes with the primary server or with one of the plurality of secondary servers that has recorded the log and is not failed, to record the log. Accordingly, other than during the synchronization times, there is always a primary server that stores the data updates and performs the external read/write services, a first secondary server that store the data updates and acts as a backup to the primary server, and at least one other secondary server that stores logs of the data updates.

Distributed data storage systems can include a plurality of servers that store the data. A primary server communicates with one or more external computing devices to read and/or write data from or into the external computing devices. A plurality of secondary servers can maintain data synchronization with the primary server. In case that the primary server fails, a secondary server can take the role of the primary server (e.g., become a new primary server) and perform the external data read and/or write services. Storing the data on a plurality of secondary servers improves the data consistency because in case that one or more secondary servers fail, data can be retrieved from other secondary servers. However, storing the data on multiple secondary servers may not be efficient, as it may unnecessarily consume data storages.

The implementations of the present disclosure provide a technique to reduce data storage consumption on distributed storage systems without losing a track of the data updates. Rather than synchronizing multiple secondary servers with the primary server to store the data, the implementations store a log of the data (e.g., a log of data updates) on a plurality of servers and synchronize only one secondary server with the primary server for the data storage purposes.

More specifically, when a data update is received from an external source (e.g., from a user computing system), a log of the data update is recorded on the primary server and a plurality of secondary servers, and the data update is recorded only on the primary server and a first secondary server. Since a log usually takes much less memory space than data updates, the implementations reduce the memory consumption and improve the efficiency in storage space of distributed storage systems. Keeping the log on a plurality of secondary servers allows tracking the data, and protecting the data from being lost in case of a server failure or a delay between the primary and the first secondary servers in recording the data updates.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method executed by one or more processors, the method comprising:
    receiving, by the one or more processors, a user input comprising a service request;
    generating, by the one or more processors, a service response to the service request;
    subsequent to generating the service response, receiving, by the one or more processors, a request to update data stored on a distributed data storage system that comprises a primary server and a plurality of secondary servers, the request comprising data updates, the primary server being randomly selected, wherein the data updates are associated with the service request;
    sending, by the one or more processors, an update log instruction to the primary server and the plurality of secondary servers, wherein at least one of the primary server and the plurality of secondary servers records a log associated with the request;
    determining, by the one or more processors, that a log operation was completed, wherein the log has been recorded by a first secondary server of the plurality of secondary servers;
    in response to determining that the log operation was completed by the first secondary server of the plurality of secondary servers, sending, by the one or more processors, a data storage instruction to the primary server and the first secondary server of the plurality of secondary servers, wherein each of the primary server and the first secondary server stores the data updates; and
    sending, by the one or more processors, a null-operation instruction to a second secondary server, wherein the null-operation instruction is used to instruct the second secondary server to perform no operation with respect to the data updates to reduce a number of copies of the data updates.

2. The computer-implemented method of claim 1, wherein at least one secondary server of the plurality of secondary servers is predetermined as being the second secondary server.

3. The computer-implemented method of claim 1, wherein the primary server is in communication with an external computing device to perform external read or write operations associated with the data updates.

4. The computer-implemented method of claim 1, wherein the null-operation instruction instructs the second secondary server to cancel storage of the data updates.

5. The computer-implemented method of claim 1, further comprising:
    determining that the primary server or the first secondary server has failed.

6. The computer-implemented method of claim 5, further comprising:
    in response to determining that the primary server or the first secondary server has failed, sending a data synchronization instruction to a third secondary server, wherein the third secondary server synchronizes with the primary server or the first secondary server that has not failed, to store the data updates.

7. The computer-implemented method of claim 1, further comprising:
    determining that the second secondary server other than the first secondary server has failed; and
    sending a log synchronization instruction to a third server so that the third server synchronizes with the primary server or one secondary server of the plurality of secondary servers that is has not failed, to record the log.

8. A non-transitory computer-readable storage medium coupled to one or more computers and configured with instructions executable by the one or more computers to:
    receive a user input comprising a service request;
    generate a service response to the service request;
    subsequent to generating the service response, receive a request to update data stored on a distributed data storage system that comprises a primary server and a plurality of secondary servers, the request comprising data updates, the primary server being randomly selected, wherein the data updates are associated with the service request;
    send an update log instruction to the primary server and the plurality of secondary servers, wherein at least one of the primary server and the plurality of secondary servers records a log associated with the request;
    determine that a log operation was completed, wherein the log has been recorded by a first secondary server of the plurality of secondary servers;
    in response to determining that the log operation was completed by the first secondary server of the plurality of secondary servers, send a data storage instruction to the primary server and the first secondary server of the plurality of secondary servers, wherein each of the primary server and the first secondary server stores the data updates; and
    send a null-operation instruction to a second secondary server, wherein the null-operation instruction is used to instruct the second secondary server to perform no operation with respect to the data updates to reduce a number of copies of the data updates.

9. The non-transitory computer-readable storage medium of claim 8, wherein at least one secondary server of the plurality of secondary servers is predetermined as being the second secondary server.

10. The non-transitory computer-readable storage medium of claim 8, wherein the primary server is in communication with an external computing device to perform external read or write operations associated with the data updates.

11. The non-transitory computer-readable storage medium of claim 8,
wherein the null-operation instruction instructs the second secondary server to cancel storage of the data updates.

12. The non-transitory computer-readable storage medium of claim 8, wherein the secondary server is a first secondary server, and the medium is further configured with instructions executable by the one or more computers to:
determine that the primary server or the first secondary server has failed.

13. The non-transitory computer-readable storage medium of claim 12, wherein the medium is further configured with instructions executable by the one or more computers to:
in response to determining that the primary server or the first secondary server has failed, sending a data synchronization instruction to a third secondary server, wherein the third secondary server synchronizes with the primary server or the first secondary server that has not failed, to store the data updates.

14. The non-transitory computer-readable storage medium of claim 8, wherein the secondary server is a first secondary server, and the medium further configured with instructions executable by the one or more computers to:
determine that the second secondary server other than the first secondary server has failed; and
send a log synchronization instruction to a third server so that the third server synchronizes with the primary server or one secondary server of the plurality of secondary servers that is has not failed, to record the log.

15. A system, comprising:
one or more computers; and
one or more computer-readable memories coupled to the one or more computers and having tangible, non-transitory, machine-readable media storing one or more instructions executable by the one or more computers to:
receive a user input comprising a service request;
generate a service response to the service request;
subsequent to generating the service response, receive a request to update data stored on a distributed data storage system that comprises a primary server and a plurality of secondary servers, the request comprising data updates, the primary server being randomly selected, wherein the data updates are associated with the service request;
send an update log instruction to the primary server and the plurality of secondary servers, wherein at least one of the primary server and the plurality of secondary servers records a log associated with the request;
determine that a log operation was completed, wherein the log has been recorded by a first secondary server of the plurality of secondary servers;
in response to determining that the log operation was completed by the first secondary server of the plurality of secondary servers, send a data storage instruction to the primary server and the first secondary server of the plurality of secondary servers, wherein each of the primary server and the first secondary server stores the data updates; and
send a null-operation instruction to a second secondary server, wherein the null-operation instruction is used to instruct the second secondary server to perform no operation with respect to the data updates to reduce a number of copies of the data updates.

16. The system of claim 15, wherein at least one secondary server of the plurality of secondary servers is predetermined as being the second secondary server.

17. The system of claim 15, wherein the primary server is in communication with an external computing device to perform external read or write operations associated with the data updates.

* * * * *

UNITED STATES PATENT AND TRADEMARK OFFICE
CERTIFICATE OF CORRECTION

PATENT NO. : 10,693,965 B2
APPLICATION NO. : 16/722531
DATED : June 23, 2020
INVENTOR(S) : Zhenkun Yang, Yuzhong Zhao and Wenhui Shi Page 1 of 1

It is certified that error appears in the above-identified patent and that said Letters Patent is hereby corrected as shown below:

In the Claims

Claim 7, Column 24, Line 31, after "that" delete "is".

Claim 14, Column 25, Line 35, after "that" delete "is".

Signed and Sealed this
Thirteenth Day of October, 2020

Andrei Iancu
*Director of the United States Patent and Trademark Office*